United States Patent
Zhang et al.

(10) Patent No.: US 8,761,197 B2
(45) Date of Patent: Jun. 24, 2014

(54) METHOD AND APPARATUS FOR MODE TRANSITION, COMPRESSION, AND DECOMPRESSION IN ROBUST HEADER COMPRESSION

(75) Inventors: Jian Zhang, Shenzhen (CN); Xuehong Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/260,001

(22) PCT Filed: Nov. 25, 2010

(86) PCT No.: PCT/CN2010/079146
§ 371 (c)(1),
(2), (4) Date: Jun. 19, 2012

(87) PCT Pub. No.: WO2011/131007
PCT Pub. Date: Oct. 27, 2011

(65) Prior Publication Data
US 2013/0121345 A1 May 16, 2013

(30) Foreign Application Priority Data

Apr. 21, 2010 (CN) .......................... 2010 1 0154342

(51) Int. Cl.
H04W 28/06 (2009.01)
(52) U.S. Cl.
USPC ........... 370/465; 370/349; 370/389; 370/474; 370/252
(58) Field of Classification Search
CPC ......... H04L 47/38; H04L 47/365; H04J 3/24; H04W 28/06
USPC ................. 370/465, 349, 474, 252, 389, 477; 709/247
See application file for complete search history.

(56) References Cited

U.S. PATENT DOCUMENTS

| | | | |
|---|---|---|---|
| 7,450,547 B2 * | 11/2008 | Kim et al. ...................... | 370/331 |
| 7,512,716 B2 * | 3/2009 | Pelletier et al. ............... | 709/247 |
| 7,738,391 B2 * | 6/2010 | Melpignano et al. ......... | 370/252 |
| 8,300,542 B2 * | 10/2012 | Peisa et al. .................... | 370/252 |

(Continued)

FOREIGN PATENT DOCUMENTS

| CN | 1507286 A | 6/2004 |
|---|---|---|
| CN | 1595911 A | 3/2005 |

(Continued)

OTHER PUBLICATIONS

International Search Report, Oct. 27, 2011, 4 pages, PCT/CN2010/079146.

*Primary Examiner* — Rasheed Gidado
(74) *Attorney, Agent, or Firm* — Marger Johnson & McCollom PC

(57) ABSTRACT

A method and apparatus for mode transformation, compression and decompression in robust header compression is provided. The method for mode transformation includes: setting a mode parameter field in an IR/IRDYN compression package of which a package formats is Profile2 and Profile3; after receiving a mode transformation request carrying an expected target mode, a compression party obtaining information about the expected target mode from the mode transformation request and sending out the information about the expected target mode by carrying that information in the mode parameter field in the IR/IRDYN compression package; a decompression party obtaining mode parameter information from the mode parameter field in the IR/IRDYN compression package. The present invention can ensure that deadlock of the mode transformation will not occur on the original procedure.

4 Claims, 7 Drawing Sheets

(56) References Cited

U.S. PATENT DOCUMENTS

| | | | |
|---|---|---|---|
| 8,406,212 B2 * | 3/2013 | Liu et al. | 370/349 |
| 2005/0180383 A1 * | 8/2005 | Kim et al. | 370/349 |
| 2007/0165635 A1 * | 7/2007 | Zhang et al. | 370/390 |
| 2008/0080559 A1 * | 4/2008 | Singh | 370/477 |

FOREIGN PATENT DOCUMENTS

| | | |
|---|---|---|
| CN | 1684466 A | 10/2005 |
| CN | 1918875 A | 2/2007 |
| CN | 1996941 A | 7/2007 |
| CN | 101069401 A | 11/2007 |
| CN | 101212404 A | 7/2008 |
| CN | 101494641 A | 7/2009 |
| CN | 101707616 A | 5/2010 |
| CN | 101835196 A | 9/2010 |
| CN | 101848491 A | 9/2010 |
| EP | 1808995 A1 | 7/2007 |
| KR | 20100029319 A | 3/2010 |

* cited by examiner

METHOD AND APPARATUS FOR MODE TRANSITION, COMPRESSION, AND DECOMPRESSION IN ROBUST HEADER COMPRESSION

TECHNICAL FIELD

The present invention relates to a robust header compression algorithm in the mobile communication field, generally provides a method for mode transformation, comprising: modification, mode transformation process and implementation method for IR (Initial and Refresh)/IRDYN (IR Dynamic) compressed package format.

BACKGROUND OF THE RELATED ART

Compared with a wired link, a wireless link in the mobile communication system has lower transmission rate and higher bit error rate due to the limitation of physical condition. In order to effectively utilize the limited wireless channel bandwidth resource, a robust header compression technology (hereafter abbreviated as ROHC) is introduced. The core of the ROHC is to utilize the information redundant between packets of service stream to transparently compress and decompress the information in packet header between directly connected nodes. The ROHC technology is described by RFC3095 document of IETF (Internet Engineering Task Force) and revised by the IETF in February, 2007, and the revised document is RFC4815.

Mode is a very important concept in the ROHC. There are three kinds of operation modes defined in the RFC3095 protocol, and they are a Unidirectional mode (hereafter abbreviated as U mode), Bidirectional Optimistic mode (hereafter abbreviated as O mode), Bidirectional Reliable mode (hereafter abbreviated as R mode) respectively.

There is no feedback channel under the U mode, a data packet is only sent in one direction, i.e., the direction from a compressor to a decompressor, and no feedback packet is sent from the decompressor to the compressor. The state change of compressor mainly relies on periodic update and irregular change of header fields in the packet stream. Compression efficiency of the U mode is lower than the other two modes due to periodic update and lacking of feedback mechanism for error recovery. The compression of the ROHC must start from the U mode. The compressor can start to be transformed into other modes after the compressor receives a feedback package indicating the mode transferring.

Similarity exists between the O mode and the U mode, and their difference is in that the O mode has a feedback channel from the decompressor to the compressor for error recovery and important context update. The periodical update is used under the O mode no longer. The target of the O mode lies in furthest increasing the compression efficiency and less utilizing the feedback channel, and the O mode reduces error packages causing by residing error or context invalidity.

There is a greater difference between the R mode and the above two modes, and the important difference is in greatly utilizing of the feedback channel and preventing contexts of the compressor and decompressor from out of step. The sending of the feedback under the R mode is used for confirming all the context updates, including the update of sequence number field. The target of the R mode is in furthest improving the robustness, preventing or reducing the further expansion of package dropping and error package, and also reducing the probability of context invalidity in greatest degree even if the package dropping or error package occur.

Transformation can occurs between various modes, and the mode transformation is initiated by sending the feedback package carrying a CRC checking field from the decompressor to the compressor. It is described in section 5.6 of RFC3095 that three operation modes can transform with each other, and a schematic diagram of the mode transformation is shown in FIG. 1.

Additionally, in section 5.6 of RFC3095 and section 3.1 of RFC4815, in order to optimize the flow of the mode transformation, the protocol introduces two state variables at the compressor side, and the two state variables are C_MODE (compressor mode variable) and C_TRANS (compressor mode transformation state variable) respectively. The value of the C_MODE is in {U, O, R}, and the parameter meanings is respectively U mode, O mode, and R mode; and the initial value of the C_MODE is U. The value of the C_TRANS is in {P, D}, and the parameter meanings is respectively P (PENDING) and D (DONE); and the initial value of the C_TRANS is D.

Two state variables are also introduced at the decompressor side, and the two state variables are D_MODE (decompressor mode variable) and D_TRANS (decompressor mode transformation state variable) respectively. The value of the D_MODE is in {U, O, R}, and the initial value is U; and the value of the D_TRANS is in {I (Initiated), P, D}, and the initial value is D.

The flow of the mode transformation of ROHC is initiated by sending the feedback package carrying a desired target mode by the decompressor. In the present protocol, in addition to the transformation from the U mode to the O mode is completed by one message, all the other mode transformations are completed by way of three-way handshake. The initial, middle and final states in the three-way handshake are described by the above state variables, and the protocol prescribes that:

C_MODE and D_MODE indicate instant states of compressor and decompressor;

PENDING in C_TRANS indicates receiving a state transformation request of the decompressor;

DONE in C_TRANS indicates that the flow of mode transformation at the compressor side is done;

INITIATED in D_TRANS indicates that the decompressor initiates a mode transformation request at the moment;

PENDING in D_TRANS indicates that the decompressor receives a mode transformation request response sent by the compressor;

DONE in D_TRANS indicates that the flow of mode transformation at the decompressor side is done.

FIG. 2 shows a transformation process from the O mode to the R mode.

In FIG. 2, the decompressor continues to keep in the INITIATED state as long as the decompressor have not received IR, IRDYN or UOR-2 compression package of which the mode transformation parameter is set as R. When the C_TRANS is P, the compressor cannot send the compression package of profile 0 or profile 1, i.e., cannot send the compression package of profile 0 or profile 1 before receiving ACK of UOR-2, IRDYN or IR compression package of which the mode transformation parameter is R. After acknowledging the UOR-2, IRDYN or IR compression package, the decompressor receives the compression package of profile 0 or profile 1, and then can set the D_TRANS as D, and the flow ends.

The transformation flow from the U mode to the R mode is the same as the transformation flow from the O mode to the R mode.

FIG. 3 is a transformation flow from the R mode to the O mode.

The decompressor continues to keep in the INITIATED state as long as the decompressor have not received UOR-2, IRDYN or IR compression package of which the mode transformation parameter is set as 0. When the C_TRANS is P, the compressor cannot send the compression package of profile 0 or profile 1, i.e., cannot send the compression package of profile 0 or profile 1 before receiving ACK of UOR-2, IRDYN or IR compression package of which the mode transformation parameter is O. After acknowledging the UOR-2, IRDYN or IR compression package, the decompressor receives the compression package of profile 0 or profile 1, and then can set the D_TRANS as D, and the flow ends.

FIG. 4 is a transformation flow from R mode, O mode to U mode.

After the decompressor acknowledges the first UOR-2(U), IRDYN(U) or IR(U), i.e., the decompressor acknowledges the response of the mode transformation request, the decompressor must continue to send the feedback of which the mode is U, until receiving the compression package of profile 0 or profile 1.

In order to prevent deadlock caused by dropping the feedback message in the three-way handshake flow of the mode transformation flow, the protocol also prescribes that, when the C_TRANS is P, the mode information is included in a sent compression package to send at least periodically (i.e., IR/IRDYN/UOR-2 compression package); when the D_TRANS is P, the decompressor doesn't need to send the feedback for each received message, but must continually send the feedback carrying the CRC according to a certain period (i.e., the final ACK message in the drawing).

In the package format defined in the RFC3095 protocol, only Profile1 type (RTP package type defined in the RFC3095 protocol) IR/IRDYN compression package can carry the mode parameter, and both Profile2 type (UDP package type defined in the RFC3095 protocol) and Profile3 type (ESP package type defined in the RFC3095 protocol) IR/IRDYN compression packages do not carry mode parameters. Thus, in the first handshake, it may result in that the compressor cannot include the mode parameter in the compression package to send, thereby causing that the deadlock occurs during the mode transformation.

Content of the Invention

The technical problem solved by the present invention is to provide a method and apparatus for a mode transformation in a robust header compression, by using that method and apparatus, the defect in the RFC3095 protocol can be modified and it is ensured that the deadlock of the mode transformation will not occur in the original flow. Meanwhile, for the IPv4 packet package stream, the utilization rate of the storage space and transmission bandwidth for the existing compression package is also improved.

In order to solve the above technical problem, the present invention provides a compression method, applied to a mode transformation in a robust header compression, and the compression method comprises:

setting a mode parameter field in an Initial and Refresh (IR) compression package/Initial and Refresh Dynamic (IRDYN) compression package of which a package formats is Profile2 and Profile3; and after receiving a mode transformation request carrying an expected target mode, a compression party obtaining information about the expected target mode from the mode transformation request and sending out the information about the expected target mode by carrying that information in the mode parameter field in the IR compression package or the IRDYN compression package if the IR compression package or the IRDYN compression package of which the package format is Profile2 or Profile3 is required for replying.

The above compression method can further have the following features:

the step of setting the mode parameter field in the IR compression package/IRDYN compression package of which the package format is Profile2 and Profile3 comprises:

if the IR compression package/IRDYN compression package of which the package format is Profile2 and Profile3 adopts an IPv4 packet package stream, then setting one or more reserved bits of an IP header dynamic part of the compression package as the mode parameter field; or adding one or more bits to an IP header dynamic part of the compression package, and then setting the one or more added bits as the mode parameter field, or setting the one or more added bits and one or more reserved bits of the IP header dynamic part of the compression package as the mode parameter field together; and if the IR compression package/IRDYN compression package of which the package format is Profile2 and Profile3 adopts an IPv6 packet package stream, adding one or more bits to an IP header dynamic part of the compression package, and then setting the one or more added bits as the mode parameter field.

In order to solve the above technical problem, the present invention also provides a decompression method, applied to a mode transformation in a robust header compression, and the decompression method comprises:

setting a mode parameter field in an Initial and Refresh (IR) compression package/Initial and Refresh Dynamic (IRDYN) compression package of which a package format is Profile2 and Profile3; and after receiving a mode transformation reply, a decompression party obtaining mode parameter information from the mode parameter field in the IR compression package or the IRDYN compression package if judging that the IR compression package or the IRDYN compression package of which the package format is Profile2 or Profile3 is used for the reply.

The above decompression method can further have the following features:

the mode parameter field is set by the following manner:

if the IR compression package/IRDYN compression package of which the package format is Profile2 and Profile3 adopts an IPv4 packet package stream, then setting one or more reserved bits of an IP header dynamic part of the compression package as the mode parameter field; or adding one or more bits to an IP header dynamic part of the compression package, and then setting the one or more added bits as the mode parameter field, or setting the one or more added bits and one or more reserved bits of the IP header dynamic part of the compression package as the mode parameter field together; and if the IR compression package/IRDYN compression package of which the package format is Profile2 and Profile3 adopts an IPv6 packet package stream, adding one or more bits to an IP header dynamic part of the compression package, and then setting the one or more added bits as the mode parameter field.

In order to solve the above technical problem, the present invention also provides a method for a mode transformation in a robust header compression, and the method comprises:

setting a mode parameter field in an Initial and Refresh (IR) compression package/Initial and Refresh Dynamic (IRDYN) compression package of which a package formats is Profile2 and Profile3; and after receiving a mode transformation request carrying an expected target mode, a compression party obtaining information about the expected target mode from the mode transformation request and sending out the information about the expected target mode by carrying that information in the mode parameter field in the IR compression package or the IRDYN compression package if the IR compression package or the IRDYN compression package of which the package format is Profile2 or Profile3 is required for replying; and after receiving a mode transformation reply, a decompression party obtaining mode parameter information from the mode parameter field in the IR compression package or the IRDYN compression package if judging that the IR compression package or the IRDYN compression package of which the package format is Profile2 or Profile3 is used for the reply.

The above method for the mode transformation can further have the following features:

the step of setting the mode parameter field in the IR compression package/IRDYN compression package of which the package format is Profile2 and Profile3 comprises:

if the IR compression package/IRDYN compression package of which the package format is Profile2 and Profile3 adopts an IPv4 packet package stream, then setting one or more reserved bits of an IP header dynamic part of the compression package as the mode parameter field; or adding one or more bits to an IP header dynamic part of the compression package, and then setting the one or more added bits as the mode parameter field, or setting the one or more added bits and one or more reserved bits of the IP header dynamic part of the compression package as the mode parameter field together; and if the IR compression package/IRDYN compression package of which the package format is Profile2 and Profile3 adopts an IPv6 packet package stream, adding one or more bits to an IP header dynamic part of the compression package, and then setting the one or more added bits as the mode parameter field.

In order to solve the above technical problem, the present invention also provides a compression apparatus, applied to a mode transformation in a robust header compression, and the compression apparatus comprises:

a configuration module, configured to: set a mode parameter field in an Initial and Refresh (IR) compression package/Initial and Refresh Dynamic (IRDYN) compression package of which a package format is Profile2 and Profile3; and a compression processing module, configured to: after receiving a mode transformation request carrying an expected target mode, obtain information about the expected target mode from the mode transformation request and send out the information about the expected target mode by carrying that information in the mode parameter field in the IR compression package or the IRDYN compression package if the IR compression package or the IRDYN compression package of which the package format is Profile2 or Profile3 is required for replying.

The above compression apparatus can further have the following features:

the configuration module is configured to:

if the IR compression package/IRDYN compression package of which the package format is Profile2 and Profile3 adopts an IPv4 packet package stream, then set one or more reserved bits of an IP header dynamic part of the compression package as the mode parameter field; or add one or more bits to an IP header dynamic part of the compression package, and then set the one or more added bits as the mode parameter field, or set the one or more added bits and one or more reserved bits of the IP header dynamic part of the compression package as the mode parameter field together; and if the IR compression package/IRDYN compression package of which the package format is Profile2 and Profile3 adopts an IPv6 packet package stream, add one or more bits to an IP header dynamic part of the compression package, and then set the one or more added bits as the mode parameter field.

In order to solve the above technical problem, the present invention also provides a decompression apparatus, applied to a mode transformation in a robust header compression, and the decompression apparatus comprises:

a configuration module, configured to: set a mode parameter field in an Initial and Refresh (IR) compression package/Initial and Refresh Dynamic (IRDYN) compression package of which a package format is Profile2 and Profile3; and a decompression processing module, configured to: after receiving a mode transformation reply, obtain mode parameter information from the mode parameter field in the IR compression package or the IRDYN compression package if judging that the IR compression package or the IRDYN compression package of which the package format is Profile2 or Profile3 is used for the reply.

The above decompression apparatus can further have the following features:

the configuration module is configured to:

if the IR compression package/IRDYN compression package of which the package format is Profile2 and Profile3 adopts an IPv4 packet package stream, then set one or more reserved bits of an IP header dynamic part of the compression package as the mode parameter field; or add one or more bits to an IP header dynamic part of the compression package, and then set the one or more added bits as the mode parameter field, or set the one or more added bits and one or more reserved bits of the IP header dynamic part of the compression package as the mode parameter field together; and if the IR compression package/IRDYN compression package of which the package format is Profile2 and Profile3 adopts an IPv6 packet package stream, add one or more bits to an IP header dynamic part of the compression package, and then set the one or more added bits as the mode parameter field.

In order to solve the above technical problem, the present invention also provides a system for a mode transformation in a robust header compression, and the system comprises a configuration module, a compression processing module and a decompression processing module, wherein:

the configuration module is configured to: set a mode parameter field in an Initial and Refresh (IR) compression package/Initial and Refresh Dynamic (IRDYN) compression package of which a package format is Profile2 and Profile3;

the compression processing module is configured to: after receiving a mode transformation request carrying an expected target mode, obtain information about the expected target mode from the mode transformation request and send out the information about the expected target mode by carrying that information in the mode parameter field in the IR compression package or the IRDYN compression package if the IR compression package or the IRDYN compression package of which the package format is Profile2 or Profile3 is required for replying; and the decompression processing module is configured to: after receiving a mode transformation reply, obtain mode parameter information from the mode parameter field in the IR compression package or the IRDYN compression package if judging that the IR compression package or the IRDYN compression package of which the package format is Profile2 or Profile3 is used for the reply.

The above system for the mode transformation can further have the following features:

the configuration module is configured to:

if the IR compression package/IRDYN compression package of which the package format is Profile2 and Profile3 adopts an IPv4 packet package stream, then set one or more reserved bits of an IP header dynamic part of the compression package as the mode parameter field; or add one or more bits to an IP header dynamic part of the compression package, and then set the one or more added bits as the mode parameter field, or set the one or more added bits and one or more reserved bits of the IP header dynamic part of the compression package as the mode parameter field together; and if the IR compression package/IRDYN compression package of which the package format is Profile2 and Profile3 adopts an IPv6 packet package stream, add one or more bits to an IP header dynamic part of the compression package, and then set the one or more added bits as the mode parameter field.

The present invention provides a method and apparatus for a mode transformation in a robust header compression, which can modify the defect in the RFC3095 protocol and ensure that the deadlock of the mode transformation will not occur in the original flow. Meanwhile, for the IPv4 packet package stream, the utilization rate of the storage space and transmission bandwidth for the existing compression package is also improved.

PREFERRED EMBODIMENTS OF THE PRESENT INVENTION

The implementation scheme of the present invention is described in detail in combination with the accompanying drawings hereinafter.

First, in the present invention, a mode parameter field is set in an IR compression package/IRDYN compression package of which a package format is Profile2 and Profile3, specifically, can be set by the following setting manner.

Figure 1:
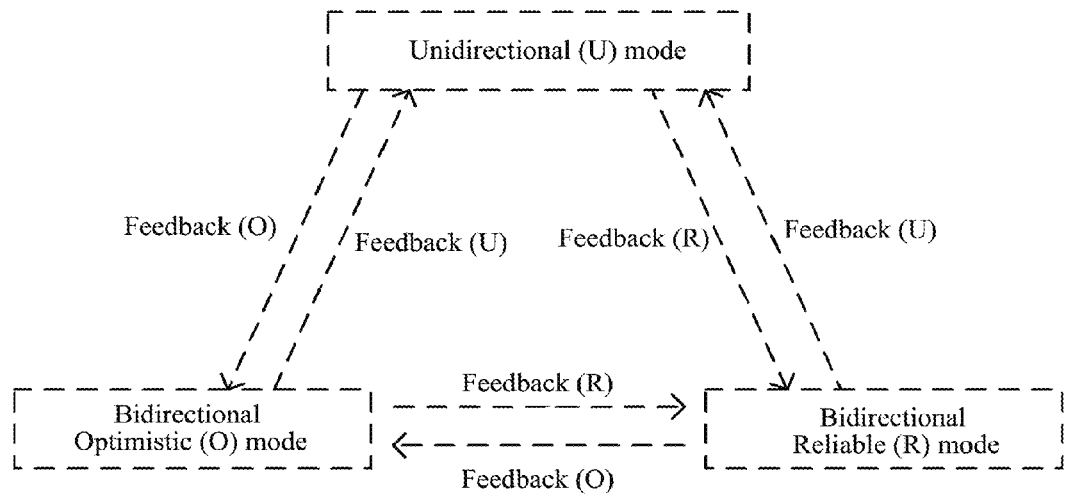
FIG. 1 is a schematic diagram of mode transformations among U mode, O mode and R mode in the related art.
Figure 2:
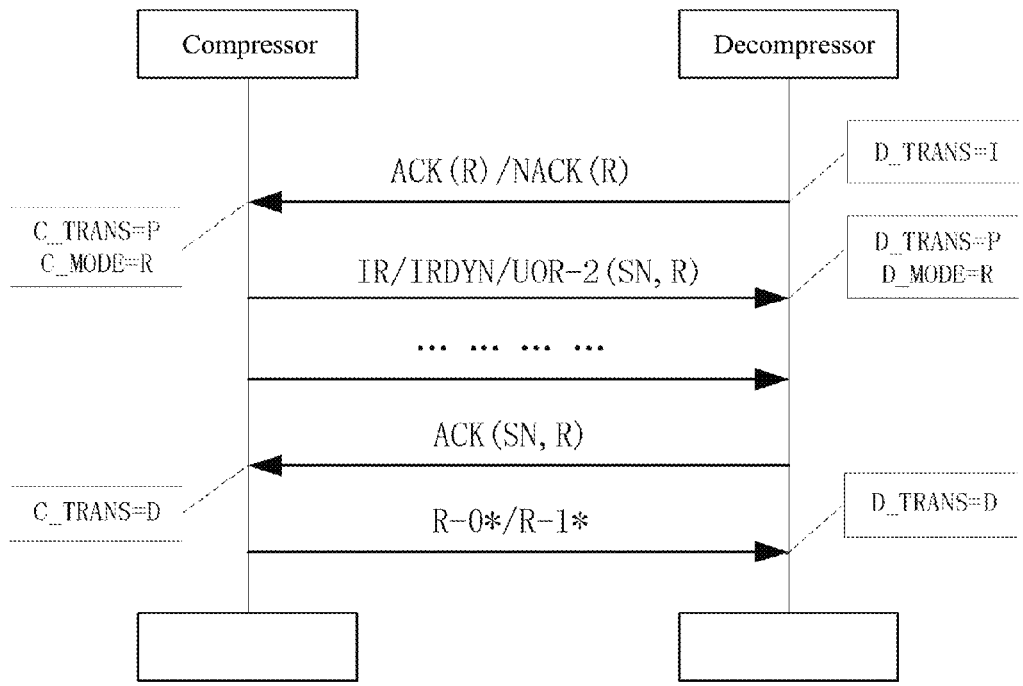
FIG. 2 is a schematic diagram of a transformation process from O mode to R mode in the related art.
Figure 3:
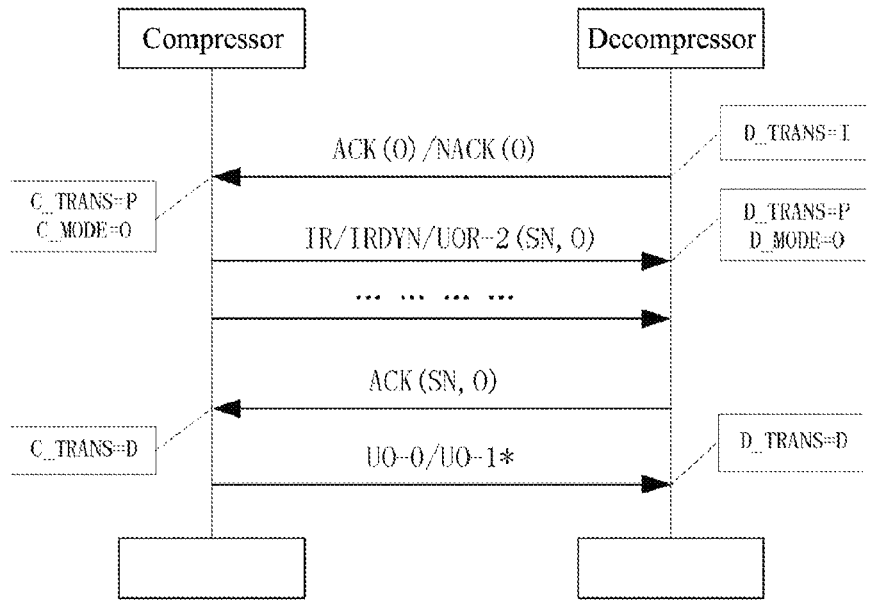
FIG. 3 is a schematic diagram of a transformation process from R mode to O mode in the related art.
Figure 4:
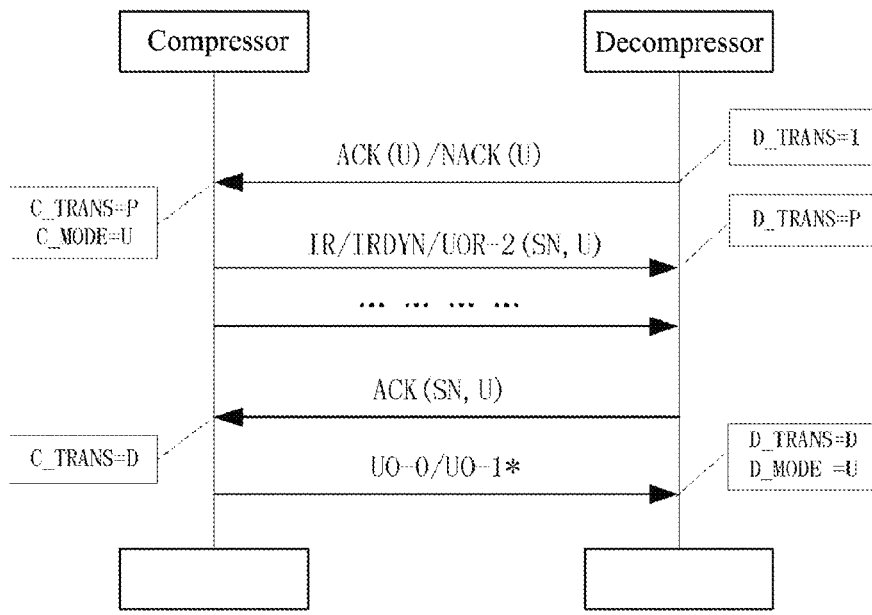
FIG. 4 is a schematic diagram of a transformation process from R mode, O mode to U mode in the related art.
Figure 5:
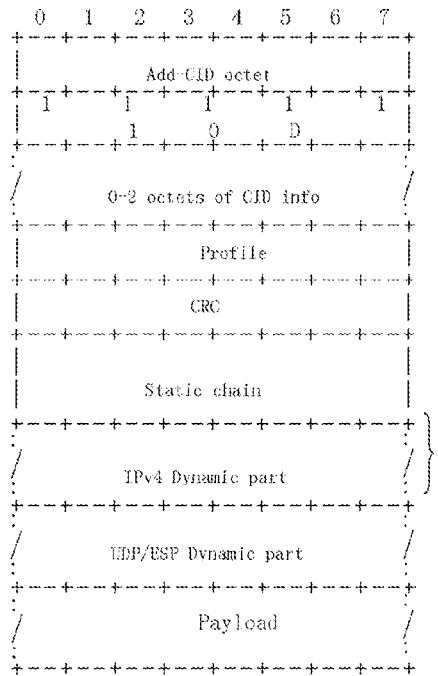
FIG. 5 is a schematic diagram of setting a mode parameter field in an IR/IRDYN package for IPv4 packet package stream Profile2 and Profile3 according to an embodiment of the present invention.
Figure 5:
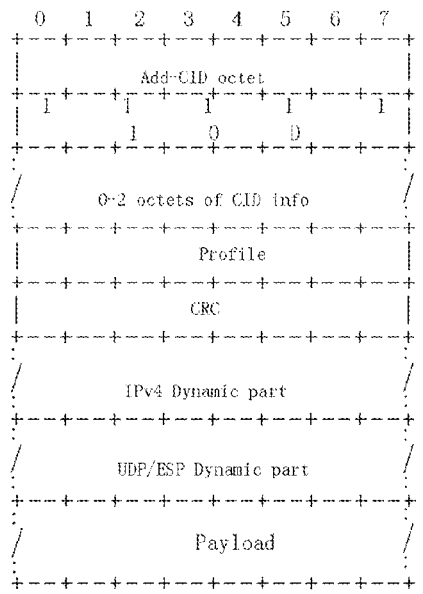
Figure 5:
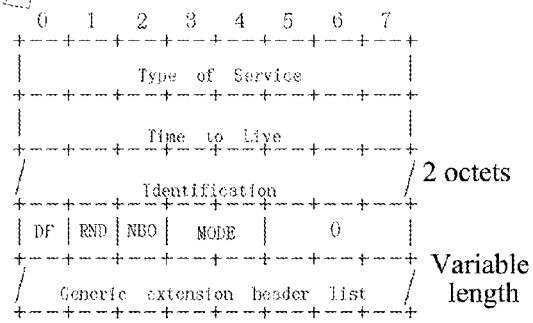

If the IR compression package/IRDYN compression package of which the package format is Profile2 and Profile3 adopts an IPv4 packet package stream, several reserved bits of an IP header dynamic part of the compression package are set as the mode parameter field; for example, as shown in FIG. 5, the third and fourth bits in the fifth byte of the IP header dynamic part are set as the mode parameter field. Or, several bits can be added to the IP header dynamic part of the compression package, and then the several added bits are set as the mode parameter field. Or, after several bits are added to the IP header dynamic part of the compression package, the several added bits and several reserved bits of the IP header dynamic part of the compression package are set as the mode parameter field together.

Figure 6:
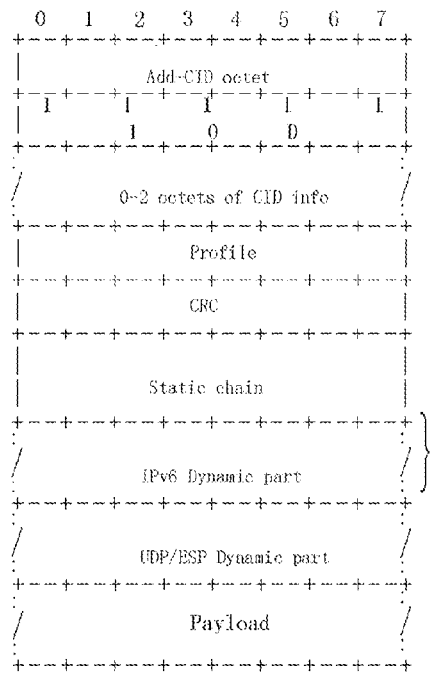
FIG. 6 is a schematic diagram of setting a mode parameter field in an IR/IRDYN package for IPv6 packet package stream Profile2 and Profile3 according to an embodiment of the present invention.
Figure 6:
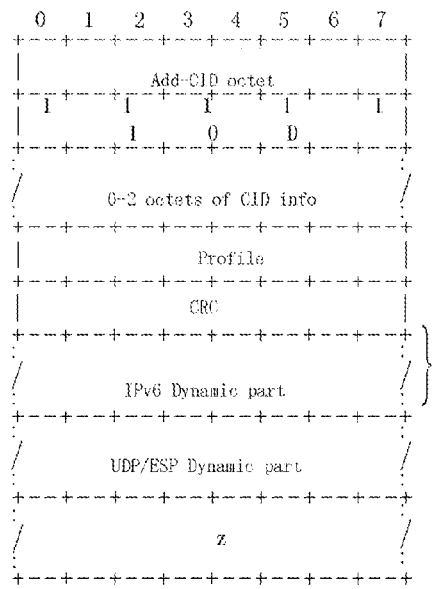
Figure 6:
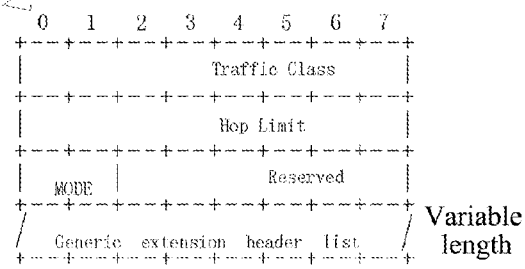

If the IR compression package/IRDYN compression package of which the package format is Profile2 and Profile3 adopts an IPv6 packet package stream, then several bits are added to the IP header dynamic part of the compression package, and then the several added bits are set as the mode parameter field; for example, as shown in FIG. 6, a byte can be added behind a Hop Limit field of the IP header dynamic part, and then the high 2-bit can be defined as the mode parameter field, and the low 6-bit can be reserved bits.

The mode parameter field of the present invention can select the position set in the IR/IRDYN package according to the practical requirement, and the present invention places no limitation on this.

In the present invention, after setting the mode parameter field in the IR compression package or the IRDYN compression package of the package format being Profile2 or Profile3 by using the above manner, expected target mode parameters can be written in the mode parameter field when a compressor responds a mode transformation request sent by a decompressor in the first handshake of the mode transformation, thereby avoiding the possibility of deadlock in the process of the mode transformation.

Specifically, after receiving the mode transformation request carrying the expected target mode, if the IR compression package or the IRDYN compression package of which the package format is Profile2 or Profile3 is required for replying, the compression party obtains the information about the expected target mode from the mode transformation request, and then sends out the information about the expected target mode by carrying that information in the mode parameter field in the IR compression package or the IRDYN compression package. Accordingly, after receiving a mode transformation reply, the decompression party can obtain the information about the expected target mode from the mode parameter field in the IR compression package or the IRDYN compression package, if judging that the package used by the reply is the IR compression package or the IRDYN compression package of which the package format is Profile2 or Profile3. Thus, the defect in the RFC3095 protocol is well modified, and it is ensured that the mode transformation will not occur the deadlock on the original procedure.

Figure 7A:
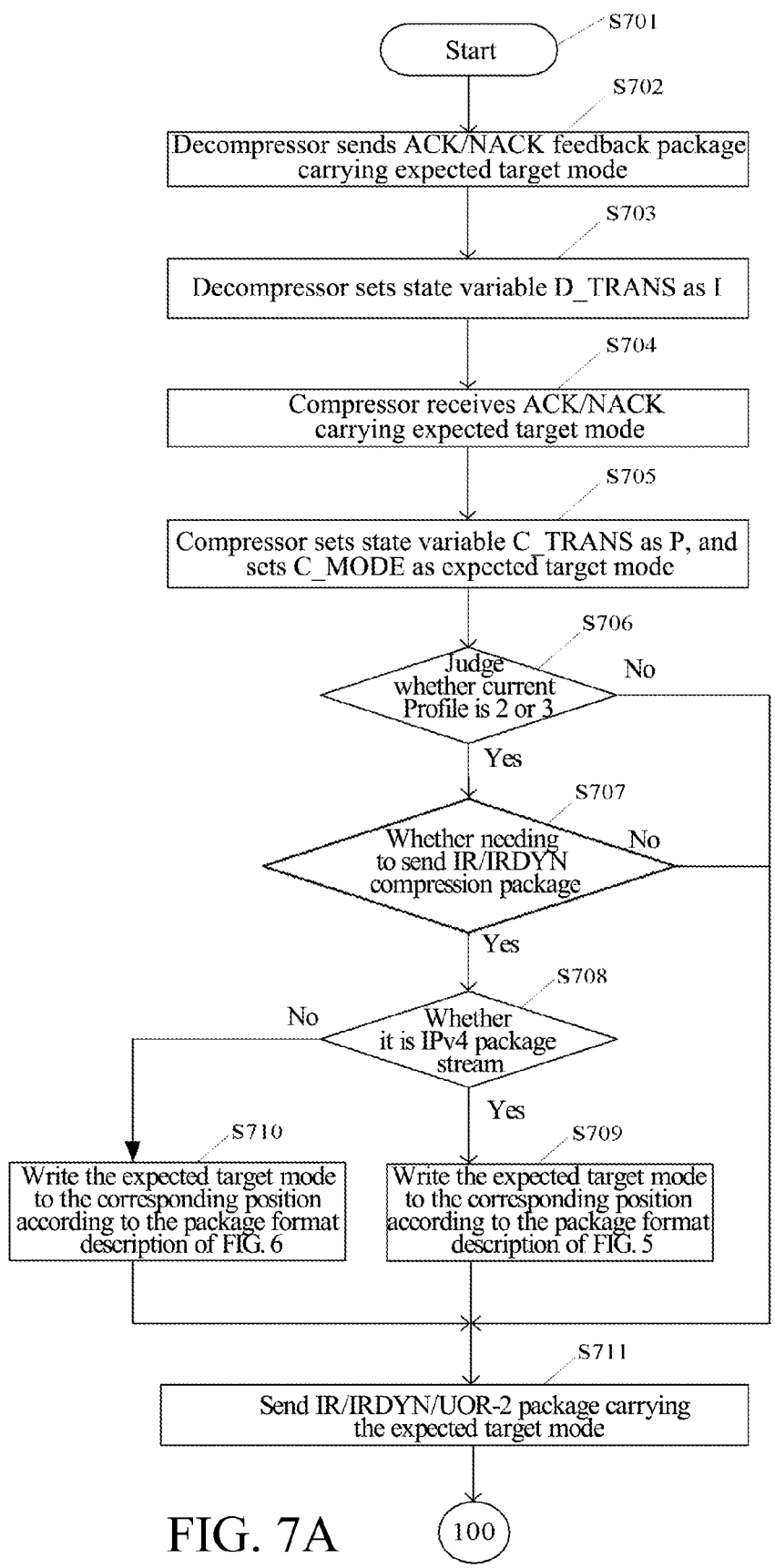
FIGS. 7A-7B is a flow chart of a method for a mode transformation in a robust header compression according to an embodiment of the present invention.
Figure 7B:
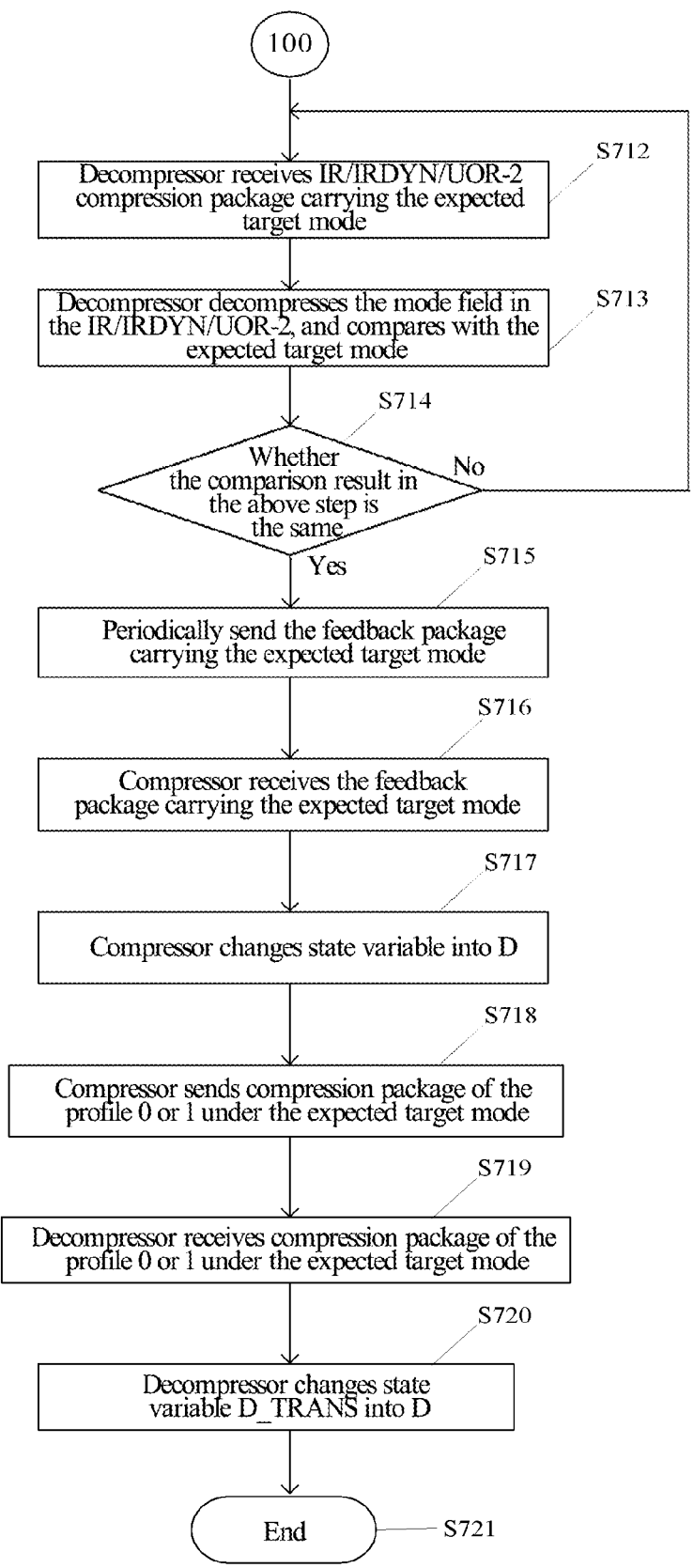

Referring to FIGS. 7A and 7B, it shows a flow chart of a method for a mode transformation in a robust header compression according to an embodiment of the present invention, and the method includes the following steps:

in step S701, a flow for the mode transformation process starts, and step S702 is performed;

in step S702, the decompression party sends an ACK/NACK feedback package carrying the expected target mode, i.e., the mode transformation request, and then step S703 is performed;

in step S703, the decompression party sets a state variable D_TRANS as I, and step S704 is performed;

in step S704, the compression party receives the ACK/NACK feedback package carrying the expected target mode, i.e., the mode transformation request, and step S705 is performed;

in step S705, the compression party sets a C_TRANS as P, and sets a C_MODE as the expected target mode, and step S706 is performed;

in step S706, it is judged whether the currently processed Profile type is 2 or 3, if yes, step S707 is performed, otherwise, step S711 is performed;

in step S707, it is judged whether the IR/IRDYN compression package is required for sending, if yes, step S708 is performed, otherwise, step S711 is performed;

in step S708, it is judged whether the current package stream is the IPv4 package stream, if yes, step S709 is performed, otherwise, step S710 is performed;

in step S709, the expected target mode is written into the corresponding position according to the package format specification of FIG. 5, and step S711 is performed;

in step S710, the expected target mode is written into the corresponding position according to the package format specification of FIG. 6, and step S711 is performed;

in step S711, the IR/IRDYN/UOR-2 compression package carrying the expected target mode is sent, and step S712 is performed;

in step S712, the decompression party receives the IR/IRDYN/UOR-2 package carrying the expected target mode, and step S713 is performed;

in step S713, the decompression party decompresses the mode parameter in the IR/IRDYN/UOR-2 package, and compares the mode parameter with the expected target mode, and step S714 is performed;

in step S714, it is judged whether the compared result in the above step is the same, if yes, step S715 is performed, otherwise, step S712 is performed;

in step S715, the decompression party periodically sends the feedback package carrying the expected target mode, and step S716 is performed;

in step S716, the compression party receives the feedback package carrying the expected target mode, and step S717 is performed;

in step S717, the compression party changes the state variable C_TRANS into D, and step S718 is performed;

in step S718, the compression party sends the type 0 or 1 of compression package under the expected target mode, and step S719 is performed;

in step S719, the decompression party receives the type 0 or 1 of compression package under the expected target mode, and step S720 is performed;

in step S720, the decompression party changes the state variable D_TRANS into D, and step S721 is performed; and in step S721, the flow of the mode transformation ends.

Figure 8:
FIG. 8 is a block diagram of a compression apparatus according to an embodiment of the present invention.

An embodiment of the present invention also provides a compression apparatus which is applied to a mode transformation in a robust header compression, and as shown in FIG. 8, the compression apparatus comprises:

a configuration module, used to: set a mode parameter field in an Initial and Refresh (IR) compression package/Initial and Refresh Dynamic (IRDYN) compression package of which a package format is Profile2 and Profile3; and a compression processing module, used to: after receiving a mode transformation request carrying an expected target mode, obtain information about the expected target mode from the mode transformation request and send out the information about the expected target mode by carrying that information in the mode parameter field in the IR compression package or the IRDYN compression package if the IR compression package or the IRDYN compression package of which the package format is Profile2 or Profile3 is required for replying.

The configuration module setting the mode parameter field comprises:

if the IR compression package/IRDYN compression package of which the package format is Profile2 and Profile3 adopts an IPv4 packet package stream, then setting several reserved bits of an IP header dynamic part of the compression package as the mode parameter field; or adding several bits to an IP header dynamic part of the compression package, and then setting the several added bits as the mode parameter field, or setting the several added bits and several reserved bits of the IP header dynamic part of the compression package as the mode parameter field together; and if the IR compression package/IRDYN compression package of which the package format is Profile2 and Profile3 adopts an IPv6 packet package stream, adding several bits to an IP header dynamic part of the compression package, and then setting the several added bits as the mode parameter field.

Figure 9:
FIG. 9 is a block diagram of a decompression apparatus according to an embodiment of the present invention.

An embodiment of the present invention also provides a decompression apparatus which is applied to a mode transformation in a robust header compression, and as shown in FIG. 9, the decompression apparatus comprises:

a configuration module, used to: set a mode parameter field in an Initial and Refresh (IR) compression package/Initial and Refresh Dynamic (IRDYN) compression package of which a package format is Profile2 and Profile3; and a decompression processing module, used to: after receiving a mode transformation reply, obtain mode parameter information from the mode parameter field in the IR compression package or the IRDYN compression package if judging that the IR compression package or the IRDYN compression package of which the package format is Profile2 or Profile3 is used for the reply.

The configuration module setting the mode parameter field comprises:

if the IR compression package/IRDYN compression package of which the package format is Profile2 and Profile3 adopts an IPv4 packet package stream, then setting several reserved bits of an IP header dynamic part of the compression package as the mode parameter field; or adding several bits to an IP header dynamic part of the compression package, and then setting the several added bits as the mode parameter field, or setting the several added bits and several reserved bits of the IP header dynamic part of the compression package as the mode parameter field together; and if the IR compression package/IRDYN compression package of which the package format is Profile2 and Profile3 adopts an IPv6 packet package stream, adding several bits to an IP header dynamic part of the compression package, and then setting the several added bits as the mode parameter field.

Figure 10:
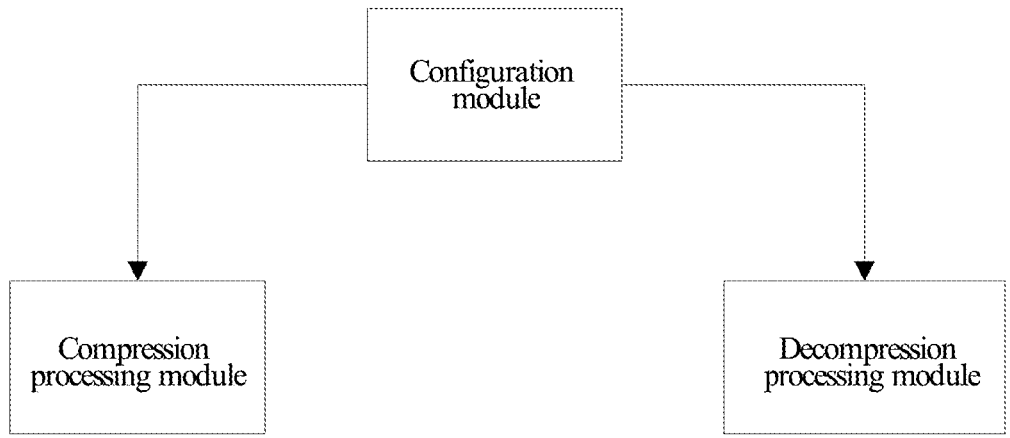
FIG. 10 is a block diagram of an apparatus for a mode transformation in a robust header compression according to an embodiment of the present invention.

An embodiment of the present invention also provides a system for a mode transformation in a robust header compression, and as shown in FIG. 10, the system comprises a configuration module, a compression processing module, and a decompression processing module, wherein:

the configuration module is used to: set a mode parameter field in an Initial and Refresh (IR) compression package/Initial and Refresh Dynamic (IRDYN) compression package of which a package format is Profile2 and Profile3;

the compression processing module is used to: after receiving a mode transformation request carrying an expected target mode, obtain information about the expected target mode from the mode transformation request and send out the information about the expected target mode by carrying that information in the mode parameter field in the IR compression package or the IRDYN compression package if the IR compression package or the IRDYN compression package of which the package format is Profile2 or Profile3 is required for replying; and the decompression processing module is used to: after receiving a mode transformation reply, obtain mode parameter information from the mode parameter field in the IR compression package or the IRDYN compression package if judging that the IR compression package or the IRDYN compression package of which the package format is Profile2 or Profile3 is used for the reply.

The configuration module setting the mode parameter field comprises:

if the IR compression package/IRDYN compression package of which the package format is Profile2 and Profile3 adopts an IPv4 packet package stream, then setting several reserved bits of an IP header dynamic part of the compression package as the mode parameter field; or adding several bits to an IP header dynamic part of the compression package, and then setting the several added bits as the mode parameter field, or setting the several added bits and several reserved bits of the IP header dynamic part of the compression package as the mode parameter field together; and if the IR compression package/IRDYN compression package of which the package format is Profile2 and Profile3 adopts an IPv6 packet package stream, adding several bits to an IP header dynamic part of the compression package, and then setting the several added bits as the mode parameter field.

Although, for the purpose of illustration, the preferred embodiments of the present invention is disclosed already, it will be aware by those skilled in the art that various improvements, additions and alternations are also possible, and thereby the scope of the present invention should not be limited to the above embodiments.

It will be understood by those skilled in the art that all of or part of steps in the above method can be completed by means of a program instructing relevant hardwires, and the program may store in a computer readable storage medium, such as a read only memory, a magnetic disk, or an optical disk, etc. Alternatively, all of or part of steps of the above embodiments can also be implemented by means of one or more integrated circuits. Accordingly, each module/unit in the above embodiments can be implemented in the form of hardware or software function module. The present invention is not limited to any particular form of combination of hardware and software.

INDUSTRIAL APPLICABILITY

The present invention provides a method and apparatus for a mode transformation in a robust header compression, which can modify the defect in the RFC3095 protocol and ensure that the deadlock of the mode transformation will not occur in the original flow. Meanwhile, for the IPv4 packet package stream, the utilization rate of the storage space and transmission bandwidth for the existing compression package is also improved.

What we claim is:

1. A compression method, applied to a mode transformation in a robust header compression, and comprising the following computer-implemented steps:

setting a mode parameter field in an Initial and Refresh (IR) compression package/Initial and Refresh Dynamic (IRDYN) compression package of which a package formats is Profile2 and Profile3 type; and after receiving a mode transformation request carrying an expected target mode, a compression party obtaining information about the expected target mode from the mode transformation request and sending out the information about the expected target mode by carrying that information in the mode parameter field in the IR compression package or the IRDYN compression package if the IR compression package or the IRDYN compression package of which the package format is Profile2 or Profile3 type is required for replying;

wherein, the step of setting the mode parameter field in the IR compression package/IRDYN compression package of which the package format is Profile2 and Profile3 type comprises:

if the IR compression package/IRDYN compression package of which the package format is Profile2 and Profile3 type adopts an Internet Protocol version 4 (IPv4) packet package stream, then setting one or more reserved bits of an Internet Protocol (IP) header dynamic part of the compression package as the mode parameter field; or adding one or more bits to an IP header dynamic part of the compression package, and then setting the one or more added bits as the mode parameter field, or setting the one or more added bits and one or more reserved bits of the IP header dynamic part of the compression package as the mode parameter field together; and if the IR compression package/IRDYN compression package of which the package format is Profile2 and Profile3 type adopts an Internet Protocol version 6 (IPv6) packet package stream, adding one or more bits to an IP header dynamic part of the compression package, and then setting the one or more added bits as the mode parameter field.

2. A decompression method, applied to a mode transformation in a robust header compression, and comprising the following computer-implemented steps:

setting a mode parameter field in an Initial and Refresh (IR) compression package/Initial and Refresh Dynamic (IRDYN) compression package of which a package format is Profile2 and Profile3 type; and after receiving a mode transformation reply, a decompression party obtaining mode parameter information from the mode parameter field in the IR compression package or the IRDYN compression package if judging that the IR compression package or the IRDYN compression package of which the package format is Profile2 or Profile3 type is used for the reply;

wherein, the mode parameter field is set by the following manner:

if the IR compression package/IRDYN compression package of which the package format is Profile2 and Profile3 type adopts an Internet Protocol version 4 (IPv4) packet package stream, then setting one or more reserved bits of an Internet Protocol (IP) header dynamic part of the compression package as the mode parameter field; or adding one or more bits to an IP header dynamic part of the compression package, and then setting the one or more added bits as the mode parameter field, or setting the one or more added bits and one or more reserved bits of the IP header dynamic part of the compression package as the mode parameter field together; and if the IR compression package/IRDYN compression package of which the package format is Profile2 and Profile3 type adopts an Internet Protocol version 6 (IPv6) packet package stream, adding one or more bits to an IP header dynamic part of the compression package, and then setting the one or more added bits as the mode parameter field.

3. A compression apparatus, applied to a mode transformation in a robust header compression, comprising: at least one processor executing a configuration module and a compression processing module, wherein:

the configuration module, configured to: set a mode parameter field in an Initial and Refresh (IR) compression package/Initial and Refresh Dynamic (IRDYN) compression package of which a package format is Profile2 and Profile3 type; and the compression processing module, configured to: after receiving a mode transformation request carrying an expected target mode, obtain information about the expected target mode from the mode transformation request and send out the information about the expected target mode by carrying that information in the mode parameter field in the IR compression package or the IRDYN compression package if the IR compression package or the IRDYN compression package of which the package format is Profile2 or Profile3 type is required for replying;

wherein, the configuration module is configured to:

if the IR compression package/IRDYN compression package of which the package format is Profile2 and Profile3 type adopts an Internet Protocol version 4 (IPv4) packet package stream, then set one or more reserved bits of an Internet Protocol (IP) header dynamic part of the compression package as the mode parameter field; or add one or more bits to an IP header dynamic part of the compression package, and then set the one or more added bits as the mode parameter field, or set the one or more added bits and one or more reserved bits of the IP header dynamic part of the compression package as the mode parameter field together; and if the IR compression package/IRDYN compression package of which the package format is Profile2 and Profile3 type adopts an Internet Protocol version (IPv6) packet package stream, add one or more bits to an IP header dynamic part of the compression package, and then set the one or more added bits as the mode parameter field.

4. A decompression apparatus applied to a mode transformation in a robust header compression, comprising: ate least one processor executing a configuration module and a decompression processing module, wherein:

the configuration module, configured to: set a mode parameter field in an Initial and Refresh (IR) compression package/Initial and Refresh Dynamic (IRDYN) compression package of which a package format is Profile2 and Profile3 type; and the decompression processing module, configured to: after receiving a mode transformation reply, obtain mode parameter information from the mode parameter field in the IR compression package or the IRDYN compression package if judging that the IR compression package or the IRDYN compression package of which the package format is Profile2 or Profile3 type is used for the reply;

wherein, the configuration module is configured to:

if the IR compression package/IRDYN compression package of which the package format is Profile2 and Profile3 type adopts an Internet Protocol version (IPv4) packet package stream, then set one or more reserved bits of an Internet Protocol (IP) header dynamic part of the compression package as the mode parameter field; or add one or more bits to an IP header dynamic part of the compression package, and then set the one or more added bits as the mode parameter field, or set the one or more added bits and one or more reserved bits of the IP header dynamic part of the compression package as the mode parameter field together; and if the IR compression package/IRDYN compression package of which the package format is Profile2 and Profile3 type adopts an Internet Protocol version 6 (IPv6) packet package stream, add one or more bits to an IP header dynamic part of the compression package, and then set the one or more added bits as the mode parameter field.

* * * * *

UNITED STATES PATENT AND TRADEMARK OFFICE
CERTIFICATE OF CORRECTION

PATENT NO.       : 8,761,197 B2
APPLICATION NO.  : 13/260001
DATED            : June 24, 2014
INVENTOR(S)      : Jian Zhang et al.

Page 1 of 1

It is certified that error appears in the above-identified patent and that said Letters Patent is hereby corrected as shown below:

In the claims

In column 14, line 10, replace "ate" with -- at --.

Signed and Sealed this
Sixteenth Day of February, 2016

Michelle K. Lee
*Director of the United States Patent and Trademark Office*